(12) United States Patent
Virgen (10) Patent No.: US 10,597,034 B2
(45) Date of Patent: Mar. 24, 2020

(54) METHOD FOR ADJUSTING REQUESTED VEHICLE TORQUE

(71) Applicant: Ford Global Technologies, LLC, Dearborn, MI (US)

(72) Inventor: Esteban Virgen, Monterrey (MX)

(73) Assignee: Ford Global Technologies, LLC, Dearborn, MI (US)

( * ) Notice: Subject to any disclaimer, the term of this patent is extended or adjusted under 35 U.S.C. 154(b) by 274 days.

(21) Appl. No.: 15/697,779

(22) Filed: Sep. 7, 2017

(65) Prior Publication Data

US 2019/0071087 A1 Mar. 7, 2019

(51) Int. Cl.
*B60W 30/18* (2012.01)
*B60W 40/04* (2006.01)
*B60W 50/00* (2006.01)

(52) U.S. Cl.
CPC ...... *B60W 30/18018* (2013.01); *B60W 40/04* (2013.01); *B60W 2050/0056* (2013.01); *B60W 2540/10* (2013.01); *B60W 2550/308* (2013.01); *B60W 2710/0666* (2013.01); *B60W 2710/083* (2013.01)

(58) Field of Classification Search
CPC .... B60W 30/16; B60W 30/17; B60W 30/188; B60W 40/04; B60W 2550/308; B60W 2540/10; F02D 11/105

USPC .......... 701/103–105, 110, 117, 300–302, 65, 701/29.3
See application file for complete search history.

(56) References Cited

U.S. PATENT DOCUMENTS

| | | | |
|---|---|---|---|
| 4,853,720 A * | 8/1989 | Onari | B60K 31/0008 701/110 |
| 4,962,570 A * | 10/1990 | Hosaka | B60K 26/00 123/399 |
| 5,193,506 A | 3/1993 | Ironside et al. | |
| 7,822,526 B2 * | 10/2010 | Sugano | B60W 50/16 701/301 |
| 2003/0176256 A1 * | 9/2003 | Kamichi | B60K 6/48 477/5 |
| 2003/0236624 A1 * | 12/2003 | Kimura | G08G 1/163 701/301 |
| 2008/0114521 A1 * | 5/2008 | Doering | B60W 30/16 701/96 |
| 2013/0019775 A1 | 1/2013 | Six et al. | |

* cited by examiner

*Primary Examiner* — Hai H Huynh
*Assistant Examiner* — Robert A Werner
(74) *Attorney, Agent, or Firm* — Geoffrey Brumbaugh; McCoy Russell LLP (57) ABSTRACT

A method for adjusting driveline torque output of a vehicle is described. In one example, driveline output torque of a vehicle is decreased via switching from a first curve of a transfer function to a second curve of the transfer function, and then adjusting driveline output responsive to the second curve of the transfer function.

18 Claims, 6 Drawing Sheets

METHOD FOR ADJUSTING REQUESTED VEHICLE TORQUE

FIELD

The present description relates to methods and a system for operating a powertrain of a vehicle. The vehicle may include an internal combustion engine that may be automatically stopped and started. The methods and systems may be particularly useful for improving vehicle fuel economy and reducing the possibility of automatically stopping a vehicle for short periods of time.

BACKGROUND AND SUMMARY

An internal combustion engine of a vehicle may be automatically stopped during conditions when vehicle speed is less than a threshold and when a driver demand torque is less than a threshold. The engine may be automatically stopped while the vehicle is decelerating or after the vehicle has come to a complete stop. During automatic engine stop, delivery of fuel to the engine may cease and engine rotation may stop. By ceasing combustion and stopping the engine, it may be possible to conserve fuel and extend driving range of a vehicle. However, if the vehicle's engine stops more frequently than is desired, the vehicle's fuel economy may be reduced and vehicle engine starting components may degrade at an accelerated rate.

The inventor herein has recognized the above-mentioned issues and has developed a vehicle operating method, comprising: receiving vehicle road position data of a first vehicle and a second vehicle to a controller; adjusting a relationship between accelerator pedal position and driveline torque of the first vehicle in response to a distance between the first vehicle and the second vehicle; and adjusting output of a driveline responsive to the relationship.

By adjusting a relationship between accelerator pedal position and driveline torque output in response to a distance in between a first vehicle and a second vehicle, it may be possible to provide the technical result of improving vehicle fuel economy and improving whether or not to automatically stop an engine of a driveline. For example, if a distance between a first vehicle and a second vehicle is greater than a threshold distance, a driveline may generate a first torque that is greater than a second torque when a human vehicle driver applies an accelerator pedal to a first position. However, the driveline may generate the second torque that is less than the first torque when the human vehicle driver applies the accelerator pedal to the first position when the distance between the first vehicle and the second vehicle is less than the first threshold. The lower second torque may help to reduce vehicle acceleration at times when the vehicle may have to stop shortly after the acceleration begins. In addition, by lowering the vehicle acceleration for a given accelerator pedal position, an engine of the vehicle may stop less frequently at times when the vehicle may restart shortly after stopping.

The present description may provide several advantages. Specifically, the approach may improve vehicle fuel economy by lowering vehicle acceleration rates and engine torque output for a given accelerator pedal position at times when the vehicle may stop shortly after the vehicle begins to accelerate. Further, the approach may help to avoid engine stopping when the engine will be restarted shortly after being stopped, thereby avoiding engine stoppages that may not improve vehicle fuel efficiency. In addition, the approach may reduce degradation of engine starting components by reducing less beneficial engine stoppages.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
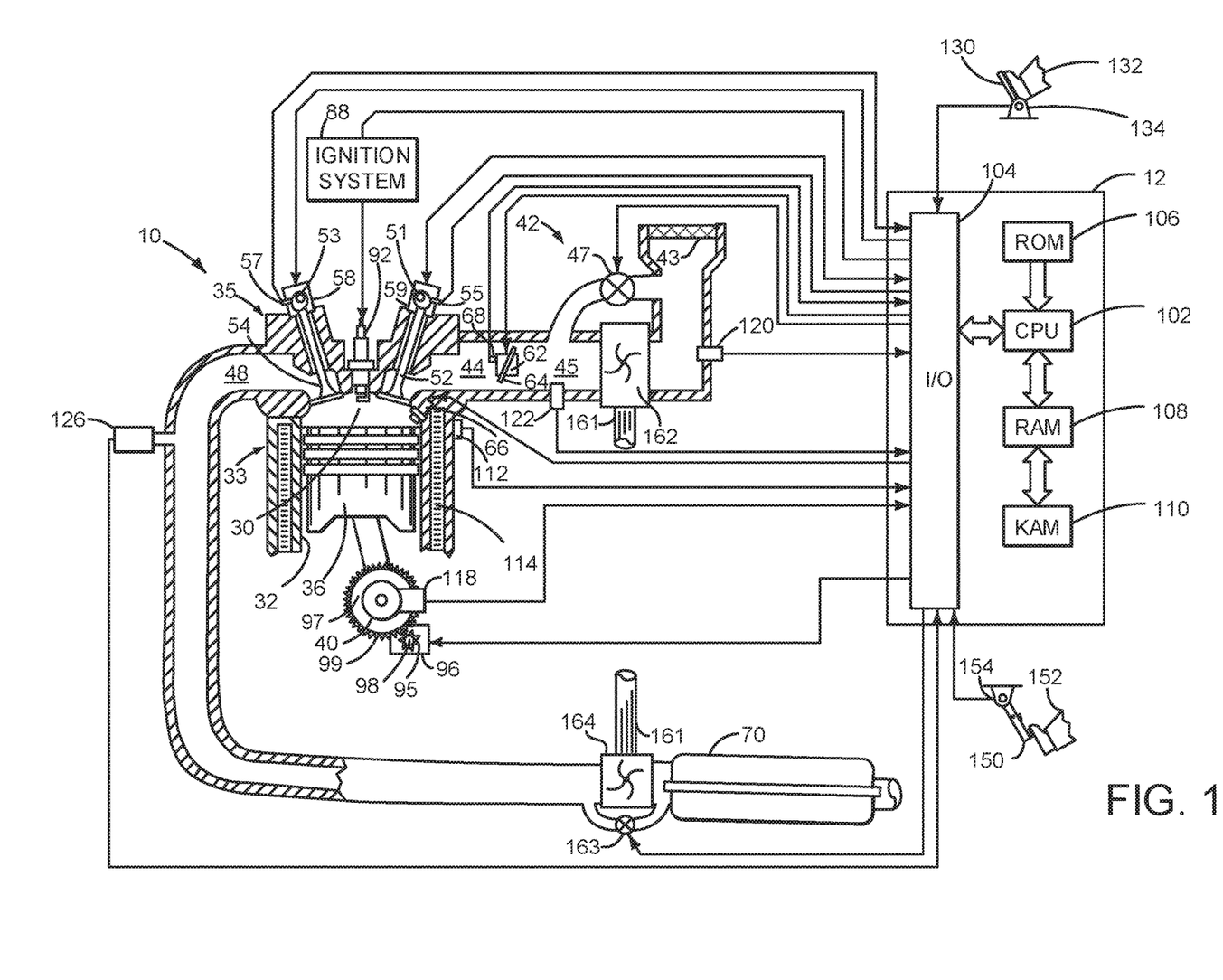
FIG. 1 shows a schematic diagram of an internal combustion engine that may be automatically stopped and started.
Figure 2:
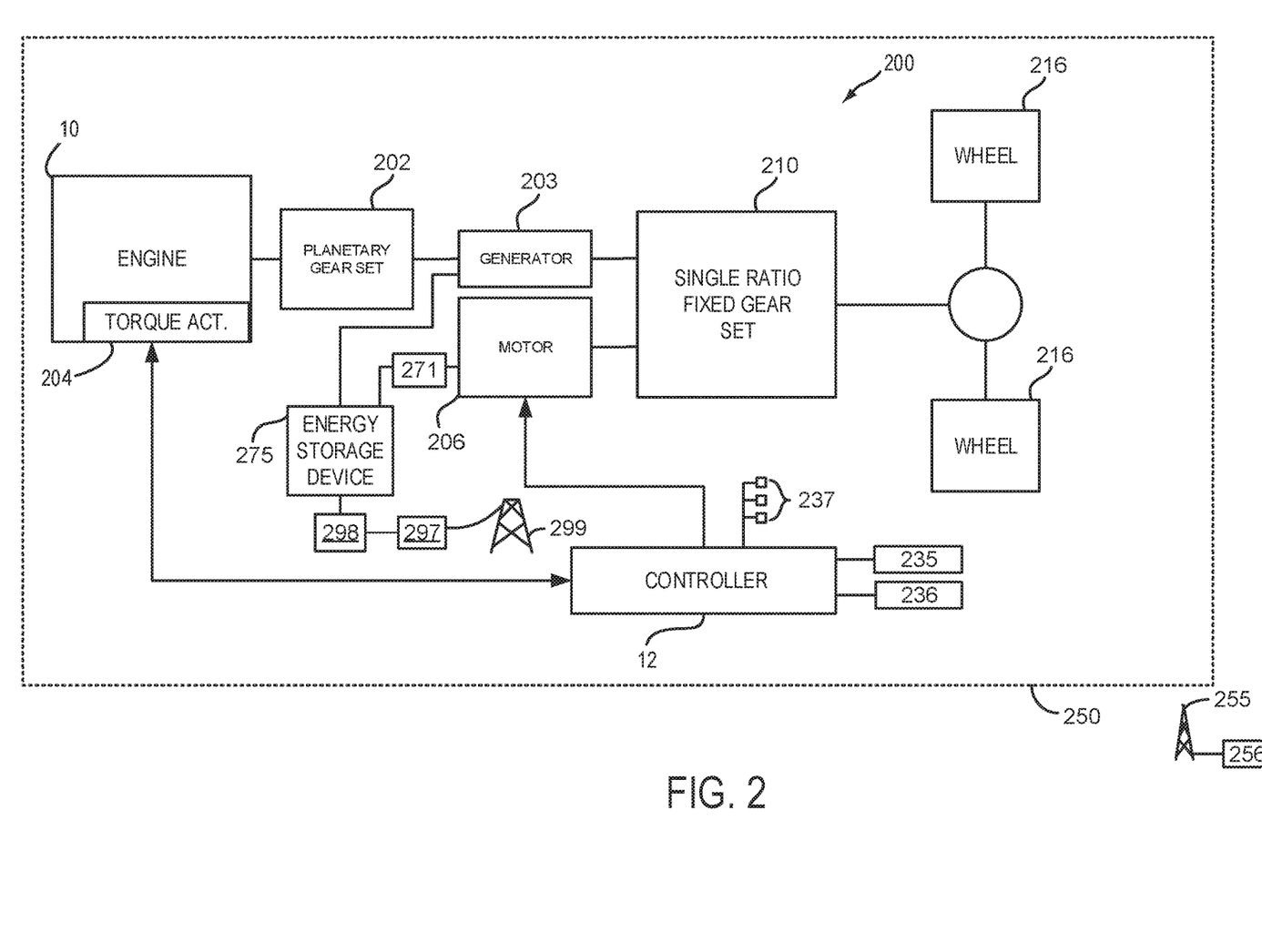
FIG. 2 shows a schematic diagram of a vehicle driveline or powertrain including the internal combustion engine shown in FIG. 1.
Figure 7:
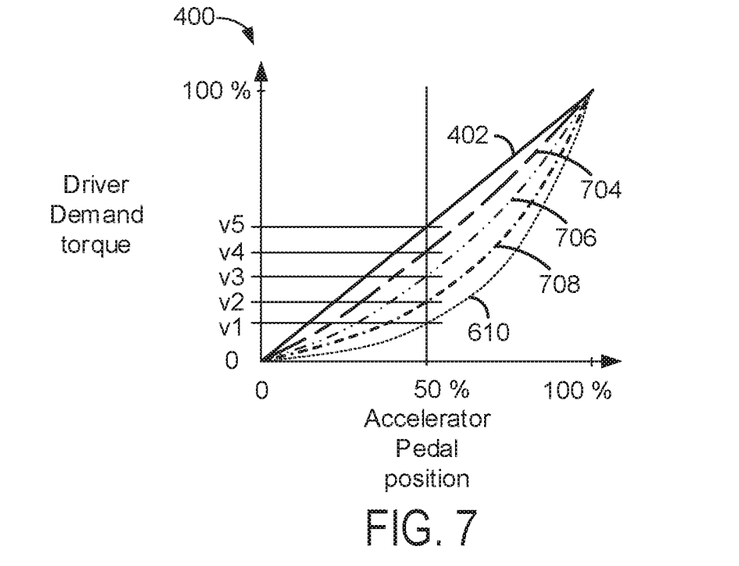
FIGS. 7 and 8 show two example transfer functions for operating a vehicle responsive to a position of an accelerator pedal.
Figure 8:
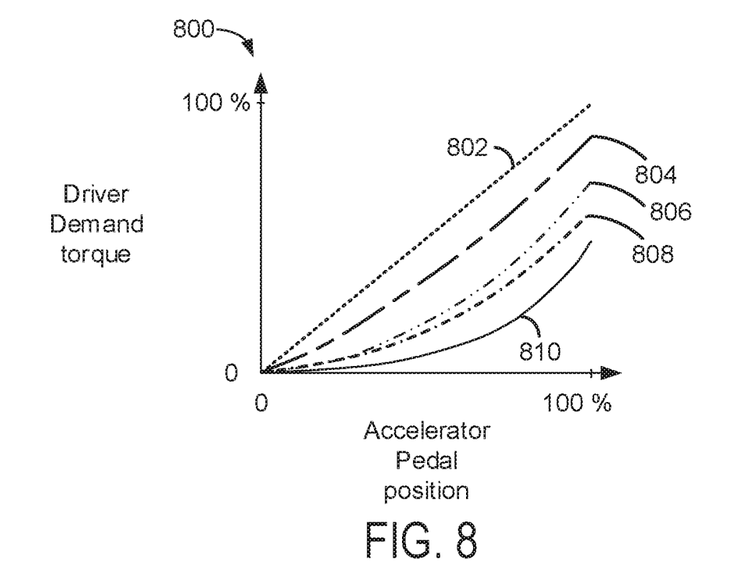
Figure 9:
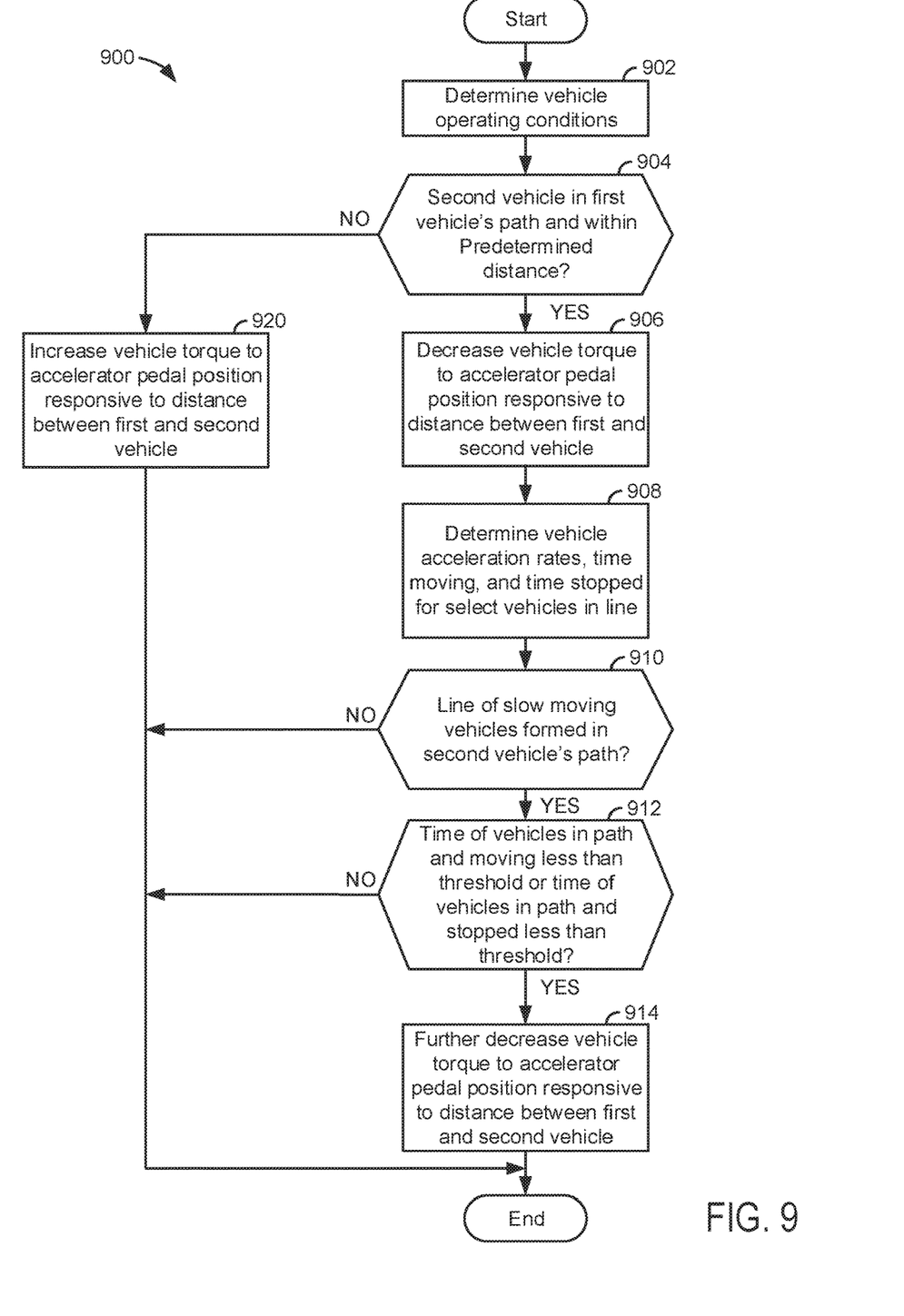
FIG. 9 shows an example method for operating a vehicle.

The present description is related to adjusting output torque of a vehicle driveline responsive to accelerator pedal position and a distance between a first vehicle and a second vehicle. FIG. 1 shows an engine that may be automatically stopped and started. The engine may be included in a hybrid driveline as is shown in FIG. 2. Alternatively, the engine may be included in a conventional vehicle driveline or driveline with only an electric propulsion source. FIGS. 3-6 show example transfer functions for adjusting driveline output responsive to accelerator pedal position and vehicle position. FIGS. 7 and 8 show two different transfer functions for adjusting driveline output. A method for adjusting driveline output is shown in FIG. 9.

Referring to FIG. 1, internal combustion engine 10, comprising a plurality of cylinders, one cylinder of which is shown in FIG. 1, is controlled by electronic engine controller 12. Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, an example of a driveline 200 is shown. Driveline 200 includes engine 10 and torque actuator (e.g., throttle, fuel injector, camshaft, etc.) 204 as described in FIG. 1. Engine 10 provides torque to planetary gear set 202 and generator 203 may operate in a speed control mode to control engine torque delivery to single ratio gearing system 210. Output from generator 203 provides electrical energy to energy storage device 275 and electric machine (e.g., motor/generator) 206. Electrical energy storage device 275 may supply electrical power to motor 206 via variable voltage controller 271 when engine 10 is not operating. Electrical energy storage device may be a battery, capacitor, or other electrical energy storage device, and electrical energy storage device 275 may be selectively coupled to a stationary electrical power grid 299 via receptacle 297 and voltage converter 298 to recharge the electrical energy storage device 275.

Electric machine 206 may be operated as a motor or a generator. Charge may be provided when electric machine 3206 is operated in a generator mode during regenerative braking. Alternatively, electric machine 206 may provide torque to wheels 216 and rotate engine 10 for starting or diagnostics. In an electric only mode, electric machine 206 may propel vehicle 250 without assistance from engine 10. In an engine only mode, engine 10 may propel vehicle 250 without assistance from electric machine 206. Torque from engine 10 and electric machine 206 may be combined in single ratio gearing system 10 to provide torque to vehicle wheels 216 via a mechanical power path. Controller 12 controls operation of engine 10, generator 204, and electric machine 206 to adjust power supplied to vehicle wheels 216.

Vehicle range sensors 237 may include light detection and ranging (LIDAR), radar, sonic, and/or other known range and object sensors. Other vehicles positioned in front of vehicle 250 (also referred to herein as the first vehicle) and in the path of vehicle 250, may have their distance to vehicle 250 sensed and reported to controller 12 via vehicle range sensors 237. In addition, controller 12 may determine the position of vehicle 250 via global positioning system (GPS) 235. Satellites (not shown) orbiting earth provide radio signals that are processed by GPS 235 to provide the position of vehicle 250. Vehicle 250 may also communicate with other vehicles or via a remote communication network via radio frequency (RF) transmitter and receiver 236. Vehicle 250 may transmit data to and receive data from remote transmitter/receiver 255 that is part of network 256 (e.g., a cloud computing navigation assistance network).

Thus, the system of FIGS. 1 and 2 provides for a vehicle system, comprising: an engine; vehicle position sensors; an accelerator pedal; and a controller including executable instructions stored in non-transitory memory to decrease driveline torque delivered by the engine or a second propulsion source of a first vehicle in response to constant output of the accelerator pedal and a distance between the first vehicle and a second vehicle decreasing as indicated via the vehicle position sensors. The vehicle system further comprises additional instructions to adjust a relationship between a position of the accelerator pedal and driveline torque of the first vehicle in response to a most recent amount of time a second and a third vehicle are stopped and a most recent amount of time the second and third vehicles are moving without being stopping while the second and third vehicles are traveling in a line of at least two vehicles. The vehicle system includes where the second propulsion source is an electric machine. The vehicle system further comprises additional instructions to increase driveline torque delivered by the engine or the second propulsion source of the first vehicle in response to constant output of the accelerator pedal and the distance between the first vehicle and a second vehicle increasing as indicated via the vehicle position sensors.

Figures 3, 4:
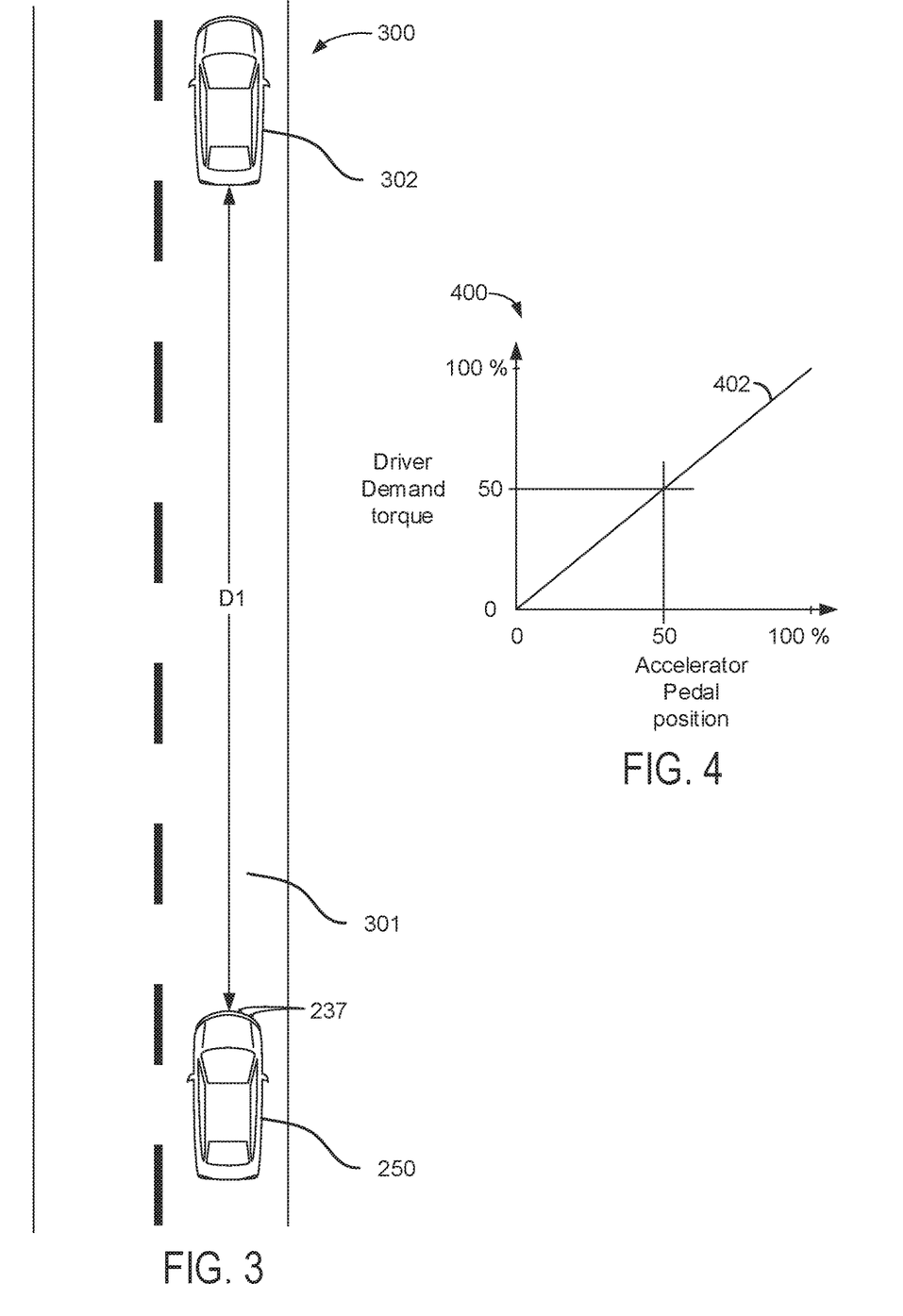
FIGS. 3 and 4 show a vehicle traveling on a road and a transfer function for operating the vehicle.

Referring now to FIG. 3, two vehicles traveling on a road are shown. Road 300 includes a first vehicle 250 and a second vehicle 302 traveling in a first lane 301 of road 300. Vehicle range sensors 237 report a distance D1 between first vehicle 250 and second vehicle 302 when second vehicle 302 is traveling in the path (e.g., same lane) of first vehicle 250 and when there are no intermediate vehicles between first vehicle 250 and second vehicle 302. The distance D1 may be updated at a predetermined rate (e.g., every 100 milliseconds) and supplied to controller 12 shown in FIG. 1. In addition, sensors 237 may have an effective vehicle detection distance D1, such as 700 meters. If second vehicle 302 is traveling in the same lane of first vehicle 250, without any intervening vehicles, at a range D1 that is beyond the effective vehicle detection distance of sensors 237, sensors 237 do not indicate the presence of second vehicle 302. Further, if first lane 301 curves, second vehicle 302 may or may not be detected via sensors 237 depending on the distance D1 between first vehicle 250 and second vehicle 302 and the curvature of first lane 301. In this example, distance D1 may be a long distance that is greater than a first threshold distance.

Referring now to FIG. 4, an example transfer function or relationship that relates accelerator pedal position to driver demand torque is shown. Transfer function 400 includes a vertical axis and a horizontal axis. The vertical axis represents driver demand torque (e.g., torque requested by a human driver at a transmission input shaft) and driver demand torque increases in the direction of the vertical axis arrow. The value of zero represents zero driver demand torque and the value 100 represents 100 percent of the available driver demand torque. For example, if the driveline includes a sole propulsion source (e.g., an engine) that may output a maximum torque of 300 Newton-meters (N-m) (e.g., the available driveline torque) at the present engine speed, a driver demand torque of 100 percent requests 300 N-m from the driveline or all of the available driveline torque. If the driveline includes the same engine and an electric machine that may output a maximum torque of 50 N-m at the present engine speed, a driver demand torque of 100 percent requests 350 N-m from the driveline.

Line 402 describes the relationship between accelerator pedal position and driver demand torque. For each percent increase in accelerator pedal position, driver demand torque increases a same percent. For example, for an accelerator pedal position of 50% applied, the driver demand torque is 50% of available driveline torque. Thus, there is a linear relationship between accelerator pedal position and driver demand torque. The driver demand torque may be provided via adjusting engine torque and/or electric machine torque to provide the driver demand torque. This type of relationship may be desirable for vehicle operating conditions of vehicle 250 when there is a large distance (e.g., greater than the first threshold distance) D1 between first vehicle 250 and second vehicle 302 as shown in FIG. 3. Thus, an accelerator pedal of first vehicle 250 may provide a driver demand torque corresponding to the relationship provided by line 402 of transfer function 400 in response to distance D1 being greater than the first threshold distance (e.g., 150 meters). By providing a driver demand torque responsive to transfer function 400, vehicle 250 may accelerate at higher rates when other vehicles are away from vehicle 250 so that desired vehicle performance may be provided.

Figures 5, 6:
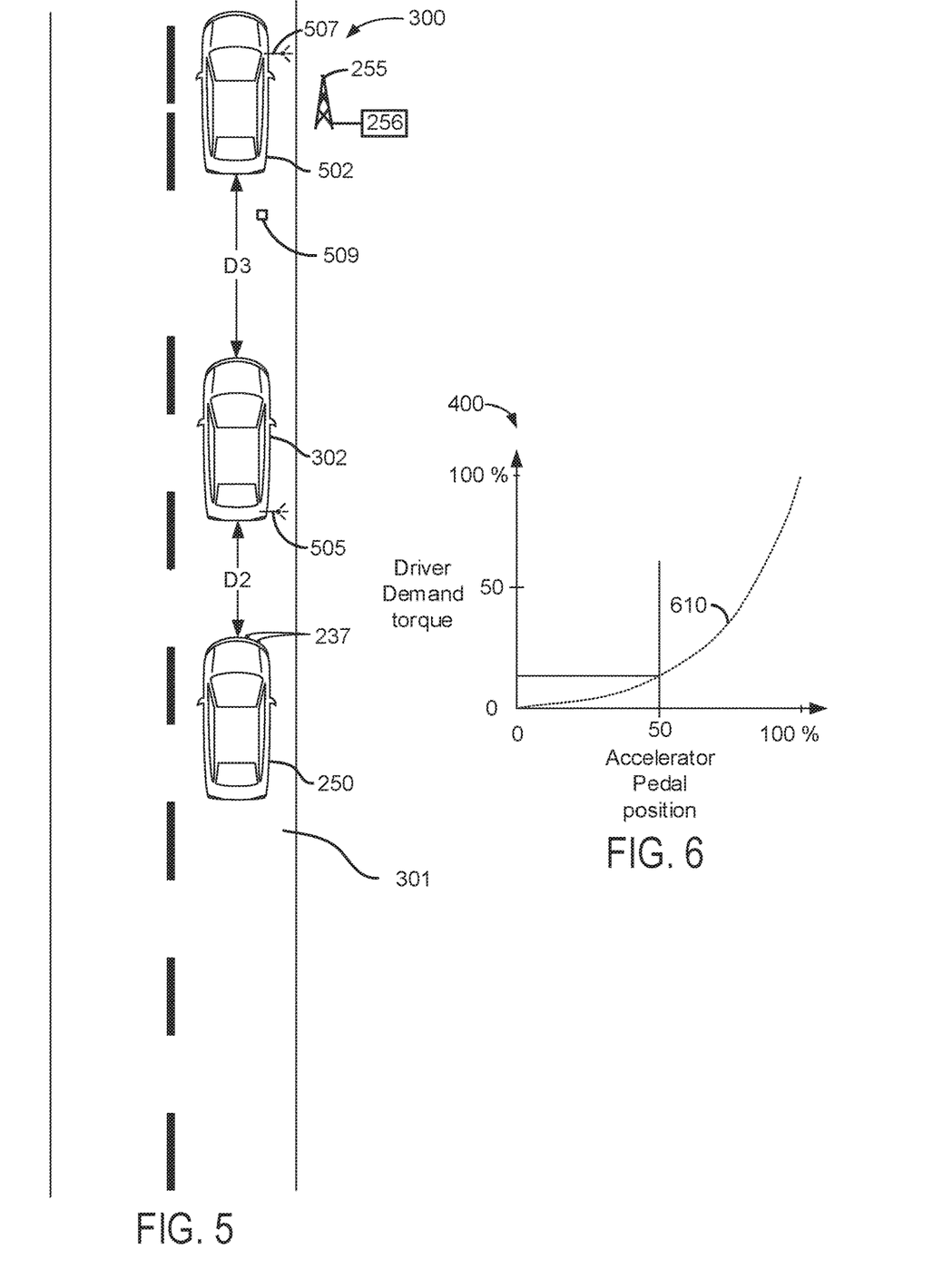
FIGS. 5 and 6 show the vehicle traveling on a road and a second transfer function for operating the vehicle.

Referring now to FIG. 5, two vehicles traveling on a road are shown. Road 300 includes a first vehicle 250, a second vehicle 302, and third vehicle 502 traveling in a first lane 301 of road 300. Vehicle range sensors 237 report a distance D2 between first vehicle 250 and second vehicle 302 when second vehicle 302 is traveling in the path (e.g., same lane) of first vehicle 250 and when there are no intermediate vehicles between first vehicle 250 and second vehicle 302. In this example, distance D2 is much shorter than distance D1 shown in FIG. 3. Thus, distance D2 may be a short distance that is less than the first threshold distance.

Second vehicle 302 is separated from third vehicle 502 by distance D3. Distance D3 may be reported to first vehicle 250 via second vehicle 302 transmitting data to remote transmitter/receiver 255 and network 256 or directly to first vehicle 250. Alternatively, sensors 509 in road 300 may provide positions of vehicles traveling on road 300 to first vehicle 250. In addition, third vehicle 502 and second vehicle 302 may transmit their respective speed, position, acceleration rate, and response delay times (e.g., if second vehicle 302 and third vehicle 502 are stopped, and then begins to move, the time it takes second vehicle 302 to move in response to movement of third vehicle 502 is the response delay time) to transmitter/receiver 255 or directly to first vehicle 250 so that first vehicle 250 may alter driveline torque in response to distance D2, distance D3, speeds and acceleration rates of second vehicle 302 and of third vehicle 502, response delay times of second vehicle 302 and third vehicle 502, amounts of time second vehicle 302 and third vehicle 502 are stopped during their most recent vehicle stops, amounts of time second vehicle 302 and third vehicle 502 are moving and not stopped during their most recent vehicle movements, and the accelerator pedal position of first vehicle 250. The driveline torque of first vehicle 250 may be adjusted via adjusting a curve of a transfer function, changing between different transfer functions, or adjusting a filtering factor applied to accelerator pedal position as described in greater detail herein. Second vehicle 302 and third vehicle 502 may transmit their respective vehicle data via transmitters 505 and 502.

Referring now to FIG. 6, an example transfer function or relationship that relates accelerator pedal position to driver demand torque is shown. Transfer function 400 includes a vertical axis and a horizontal axis as is discussed in the description of FIG. 4. However, in this example, transfer function 400 includes curve 610, which provides a lower driver demand torque for values of accelerator pedal position greater than zero and less than 100 as compared to line 402.

Curve 610 describes the relationship between accelerator pedal position and driver demand torque for when first vehicle 250 is within fifth threshold distance D2 of second vehicle 302. Relationships for second, third, and fourth threshold distances are illustrated in FIG. 7. Curve 610 provides less than one percent increase in driver demand torque for each percent increase in accelerator pedal position. For example, for an accelerator pedal position of 50% applied, the driver demand torque is about 15% of available driveline torque. Thus, a vehicle's driver may apply the accelerator pedal and a much lower driver demand torque may be output by transfer function 400 when a distance between first vehicle 250 and second vehicle 302 is less than a threshold distance D2 (e.g., 15 meters). Providing driver demand torque according to curve 610 (relationship between accelerator pedal position and driver demand torque) may be desirable for vehicle operating conditions of first vehicle 250 when there is a small distance (e.g., less than a threshold distance) D2 between first vehicle 250 and second vehicle 302 as shown in FIG. 5. Thus, an accelerator pedal of first vehicle 250 may provide a driver demand torque corresponding to the relationship provided by curve 610 of transfer function 400 in response to distance D2 being less than a threshold distance (e.g., 15 meters). By providing a driver demand torque responsive to transfer function 400, vehicle 250 may accelerate slower for a same accelerator pedal position progression when other vehicles are close to vehicle 250 and in the path of vehicle 250 as compared to when vehicle are farther apart so that the engine operating time may increase in stop and go traffic so that vehicle 250 is not frequently stopped and restarted only a short time thereafter (e.g., within 5 seconds).

Referring now to FIG. 7, an example transfer function 400 that includes a plurality of lines or curves representing relationships between vehicle accelerator pedal position and driver demand torque is shown. Transfer function 400 includes a vertical axis and a horizontal axis as is discussed in the description of FIG. 4. However, in this example, transfer function 400 includes a plurality of curves including line 402 and curve 610. Line 402 relates accelerator pedal position to driver demand torque for conditions when a distance between the first vehicle (e.g., the vehicle that provides the basis for accelerator pedal position) and a second vehicle (e.g., the vehicle being followed by the first vehicle without any intervening vehicles as shown in FIG. 3) is greater than a first threshold distance (e.g., 150 meters). Curve 704 relates accelerator pedal position to driver demand torque for conditions when a distance between the first vehicle and the second vehicle is equal to a second threshold distance (e.g., 110 meters). Curve 706 relates accelerator pedal position to driver demand torque for conditions when a distance between the first vehicle and the second vehicle is equal to a third threshold (e.g., 85 meters) distance. Curve 708 relates accelerator pedal position to driver demand torque for conditions when a distance between the first vehicle and the second vehicle is equal to a fourth threshold (e.g., 50 meters) distance. Curve 610 relates accelerator pedal position to driver demand torque for conditions when a distance between the first vehicle and the second vehicle is equal to a fifth threshold (e.g., 15 meters) distance. If a distance between the first vehicle and the second vehicle represents a distance between the distances corresponding to curves, the curves may be interpolated between to provide the desired driver demand torque. For example, if the distance between the first vehicle and the second vehicle is 130, driver demand torque is determined via interpolating between line 402 and curve 704 responsive to accelerator pedal position. Thus, transfer function 400 may be represented via a family of curves and it may be stored in controller memory as one or more functions or in a lookup table. The curves may be empirically determined while driving the vehicle in traffic or on a test track.

Transfer function 400 shows an accelerator pedal position of 50% application (e.g., the accelerator pedal is depressed half of its total travel distance). If the first vehicle is following the second vehicle at a distance greater than that corresponding to line 402, the driver demand torque is v5, or about 50%. If the first vehicle is following the second vehicle at a distance equal to the distance corresponding to curve 704, the driver demand torque is v4, or about 40%. If the first vehicle is following the second vehicle at a distance equal to the distance corresponding to curve 706, the driver demand torque is v3, or about 30%. If the first vehicle is following the second vehicle at a distance equal to the distance corresponding to curve 708, the driver demand torque is v2, or about 20%. If the first vehicle is following the second vehicle at a distance equal to the distance corresponding to curve 610, the driver demand torque is v1, or about 15%.

It should be noted that in this example, line 402, curves 704-708, and curve 610 all provide 100% driver demand torque at 100% accelerator depression. Thus, driveline torque may be reduced at some accelerator pedal positions as the distance between the first vehicle and the second vehicle is reduced; however, 100% of driver demand torque may be made available if the human driver fully applies the accelerator pedal.

Referring now to FIG. 8, an alternative example transfer function 800 that includes a plurality of lines or curves representing relationships between vehicle accelerator pedal position and driver demand torque is shown. Transfer function 800 includes a vertical axis and a horizontal axis that are equivalent to the axis of transfer function 400 as is discussed in the description of FIG. 4. Transfer function 800 includes a plurality of curves numbered 802-810. Line 802 relates accelerator pedal position to driver demand torque for conditions when a distance between the first vehicle (e.g., the vehicle that provides the basis for accelerator pedal position) and a second vehicle (e.g., the vehicle being followed by the first vehicle without any intervening vehicles as shown in FIG. 3) is greater than a first threshold distance (e.g., 150 meters). Curve 804 relates accelerator pedal position to driver demand torque for conditions when a distance between the first vehicle and the second vehicle is equal to a second threshold distance (e.g., 110 meters). Curve 806 relates accelerator pedal position to driver demand torque for conditions when a distance between the first vehicle and the second vehicle is equal to a third threshold (e.g., 85 meters) distance. Curve 808 relates accelerator pedal position to driver demand torque for conditions when a distance between the first vehicle and the second vehicle is equal to a fourth threshold (e.g., 50 meters) distance. Curve 810 relates accelerator pedal position to driver demand torque for conditions when a distance between the first vehicle and the second vehicle is equal to a fifth threshold (e.g., 15 meters) distance. If a distance between the first vehicle and the second vehicle represents a distance between the distances corresponding to curves, the curves may be interpolated between to provide the desired driver demand torque. Thus, transfer function 800 may be represented via a family of curves and it may be stored in controller memory as one or more functions or in a lookup table. The curves may be empirically determined while driving the vehicle in traffic or on a test track.

In this example, only curve 802 reaches 100% of driver demand torque. Curves 804-810 do not extend to 100% of driver demand torque when accelerator pedal position is 100% applied or depressed. Thus, the maximum driver demand torque is limited or constrained when a distance between the first vehicle and the second vehicle corresponds to the distances represented by curves 804-810. Thus, not only are the driver demand torque values provided by curves 804-810 reduced as compared to the driver demand torque values provided by curve 802, the maximum driver demand torque is also limited. Further, each of curves 804-810 provides for a different maximum driver demand torque or an upper threshold torque limit. Such curves may be useful to further improve vehicle fuel economy and to reduce frequent engine restarting.

Referring now to FIG. 9, a method for operating a vehicle is shown. At least portions of method 900 may be implemented as executable controller instructions stored in non-transitory memory. Method 900 may operate in cooperation with the system of FIGS. 1 and 2. Additionally, portions of method 900 may be actions taken in the physical world to transform an operating state of an actuator or device. The method of FIG. 9 may be incorporated into the system of FIGS. 1 and 2 as executable instructions stored in non-transitory memory.

At 902, method 902 determines vehicle operating conditions including but not limited to distance from the present vehicle (e.g., the first vehicle) to a second vehicle in the vehicle's path of travel, speeds and accelerations of vehicles in the present vehicle's path, accelerator pedal position, vehicle speed, amount of time other vehicles in the present vehicle's path are or were stopped for most recent stops of the other vehicles, amount of time other vehicles in the present vehicle's path are or were moving and not stopped for most recent times the other vehicles were or are moving, and acceleration rates of other vehicles. Method 900 proceeds to 904 after determining vehicle operating conditions.

At 904, method 900 judges if a second vehicle is in the path of the present vehicle (e.g., a first vehicle) and within a first predetermined distance of the present vehicle. Method 900 may judge that a second vehicle is in the path of the present vehicle and within a predetermined distance of the present vehicle in response to output of one or more range sensing devices. If method 900 judges that a second vehicle is in the path of the present vehicle and within a first predetermined distance (e.g., a maximum distance of the range sensing devices may sense a vehicle or another predetermined distance) of the present vehicle, if the answer is yes and method 900 proceeds to 906. Otherwise, the answer is no and method 900 proceeds to 920.

At 920, method 900 adjusts driver demand torque or driveline torque commanded for when the accelerator pedal is applied responsive to accelerator pedal position if driver demand torque has been reduced responsive to accelerator pedal position. In particular, at a time when the accelerator pedal is not applied, method 900 may adjust driver demand torque or drive line output torque commanded for times when the accelerator is applied and responsive to accelerator pedal position according to one of the following procedures below.

If method 900 has adjusts driver demand torque according to a transfer function that includes a plurality of curves as shown in FIGS. 7 and 8, method 900 adjusts driver demand torque responsive to a curve or line that provides a greatest amount of driveline output torque for each accelerator pedal position between the accelerator pedal not being applied and the accelerator pedal being applied. For example, if method 900 has recently been commanding driver demand torque responsive to curve 704 of transfer function 400 shown in FIG. 7, method 900 commands driver demand torque responsive to curve 402. Thus, for positions other than the accelerator pedal not being applied, driver demand torque is increased for a given accelerator pedal position. Thus, method 900 changes driver demand torque by changing between curves that describe driver demand torque as a function of accelerator pedal position.

If method 900 adjusts driver demand torque according to a transfer function that is expressed as a polynomial that is a function of accelerator pedal position, the coefficients of the polynomial are adjusted so that for each percent increase in accelerator pedal position, driver demand torque increases a same percent. Thus, if coefficients of the polynomial describing driver demand torque were providing driver demand torque following a curve similar to curve 704 of FIG. 7, then the coefficients of the polynomial are adjusted to provide driver demand torque according to the line 402 of FIG. 4.

If method 900 adjusts increasing driver demand torque according to transfer function that includes a single line that represents a relationship between accelerator pedal position and driver demand torque (e.g., line 402 of FIG. 4) and output of a low pass, the low pass filter modifying output of the transfer function or input to the transfer function, then method 900 adjusts the low pass filter's filtering factor to decrease an amount of time it takes for a step response input to the accelerator pedal to reach 63.2% of its final value from the step increase to the accelerator pedal. Thus, by modifying the filter constant, the driver demand torque may reach its final value sooner.

Method 900 proceeds to exit after adjusting driver demand torque or driveline torque commanded for when the accelerator pedal is applied responsive to accelerator pedal position when driver demand torque has been reduced responsive to accelerator pedal position. If driver demand torque has not been reduced responsive to accelerator pedal position, method 900 proceeds to exit and does not adjust the relationship between accelerator pedal position and driver demand torque or driveline torque commanded.

At 906, method 900 adjusts driver demand torque or driveline torque commanded for when the accelerator pedal is applied responsive to accelerator pedal position. In particular, method 900 adjusts driver demand torque or drive line output torque commanded to be reduced from a baseline torque or torque command (e.g., a relationship represented by line 402 of FIG. 4) responsive to accelerator pedal position according to one of the following procedures below.

In one example, method 900 adjusts driver demand torque according to a transfer function that includes a plurality of curves as shown in FIGS. 7 and 8. Method 900 reduces driver demand torque responsive to curves or lines that generate or provide a reduced driver demand torque or driveline output torque as compared to a baseline line or curve (e.g., line 402 of FIG. 4). In particular, a plurality of curves representing driver demand torque for a given accelerator pedal position may be provided for different distances between the first vehicle (e.g., the present vehicle that includes the plurality of curves) and a second vehicle in the first vehicle's path of travel as shown in FIG. 7. As a distance between the first vehicle and the second vehicle changes, a different curve is the basis for converting accelerator pedal position into driver demand torque. For example, if the first vehicle is closing in on the second vehicle (e.g., if the distance between the first vehicle and the second vehicle is decreasing), method 900 transitions from determining driver demand torque by applying line 402 to applying curve 704. Then, as the first vehicle moves closer to the second vehicle, method 900 transitions from determining driver demand torque by applying curve 704 to applying curve 706. Thus, method 900 changes from determining driver demand torque using one curve to determining driver demand torque using another curve. The curve or line that is the basis for determining driver demand torque is selected according to the distance between the first vehicle and the second vehicle. If the distance between the first vehicle and the second vehicle increases, method 900 selects a curve or line that is closer to the baseline line or curve (e.g., line 402 of FIG. 4). For distances that do not directly correspond to a curve, method 900 interpolates between curves. For example, if baseline line representing driver demand torque as a function of accelerator pedal position provides 50% of available driver demand torque (which corresponds to 50% of available driveline torque) when the accelerator pedal is 50% applied for a distance between the first vehicle and the second vehicle being greater than 150 meters and if a curve representing driver demand torque as a function of accelerator pedal position provides 35% of available driver demand torque (which corresponds to 35% of available driveline torque) when the accelerator pedal is 50% applied for a distance between the first vehicle and the second vehicle being equal to 110 meters, method 900 interpolates between values of the baseline line and the curve for a distance equaling 130 meters to determine a driver demand torque of 42.5% of available driver demand torque.

In another example, method 900 adjusts driver demand torque according to a transfer function that is expressed as a polynomial (e.g., Driver_demand=$C_0+C_1$accped+$C_3$accped$^2$+$C_4$accped, where Driver_demand is driver demand torque, $C0$-$C_4$ are predetermined coefficients, and accped is accelerator pedal position). A baseline group of coefficients is provided for a distance between the first vehicle and the second vehicle being greater than a threshold distance (e.g., 150 meters), then coefficients $C_0$-$C_4$ are adjusted such that driver demand torque is reduced for a given accelerator pedal input as the distance between the first vehicle and the second vehicle is reduce. The coefficients $C_0$-$C_4$ adjusted back to the baseline coefficients if the distance between the first vehicle and the second vehicle is increased to greater than the threshold distance. In this way, driver demand torque may be adjusted as a function of accelerator pedal position and distance between a first vehicle and a second vehicle.

In still another example, method 900 adjusts driver demand torque according to transfer function that includes a single line that represents a relationship between accelerator pedal position and driver demand torque (e.g., line 402 of FIG. 4) and output of a low pass (e.g., $y(i)=\alpha_1 \cdot x(i)+(1-\alpha_1) \cdot y(i-1)$, where y is the filter output, i is the sample number, x is the filter input, and $\alpha_1$ is a filtering factor). The low pass filter may receive accelerator pedal input and it may supply filtered accelerator pedal position to the transfer function, then the transfer function output driver demand torque. Alternatively, the accelerator pedal position may be input to the transfer function and the transfer function outputs driver demand torque. The driver demand torque is then input to the low pass filter and the output of the low pass filter is driver demand torque that is the basis for adjusting driveline torque. By adjusting the filtering factor, the time constant of the low pass filter may be increased so that it takes longer for the driver demand torque to reach its final value, thereby slowing driveline torque production so that it takes longer for the vehicle to accelerate so that the vehicle run may increase during stop and go traffic. The filter is applied only to increasing accelerator pedal positions and it is not applied to decreasing accelerator pedal positions.

Method 900 may select to adjust driver demand torque according to one of the above three methods or methods that provide similar functionality based on the vehicle configuration. Method 900 proceeds to 908.

At 908, method 900 receives data regarding vehicles within a predetermined distance of the present vehicle. In one example, method 900 receives traffic data for vehicles in the path of the present vehicle via radio frequency (e.g., wireless). The data may be transmitted via the other vehicles or via a network. The data received for other vehicles in the travel path of the present vehicle may include but is not limited to present acceleration rates of the vehicles, amount of time each of the other vehicles were stopped during their respective most recent stops, amount of time each of the other vehicles were moving during their respective most moving event including an amount of time the vehicles have been moving if they are presently moving, and positions of vehicles within a predetermined distance of the present vehicle. Method 900 proceeds to 910.

At 910, method 900 judges whether or not the present vehicle (e.g., the first vehicle) is in a line of a plurality of vehicles including a second vehicle in the first vehicle's and the second vehicle's path. Method 900 determines if a line of vehicles is present in front of the second vehicle and in the path of the first and second vehicle based on vehicle position information gathered at 908. If method 900 judges that a line of vehicles is formed in front of the second vehicle and within a predetermined range of the first vehicle (e.g., 2000 meters), the answer is yes and method 900 proceeds to 912. Otherwise, the answer is no and method 900 proceeds to exit. Further, if the answer is no, method 900 may command the driveline to provide the driver demand torque via adjusting engine and electric machine torque actuators (e.g., engine throttle, inverter output, etc.).

At 912, method 900 judges if one or more vehicles in the path of the present vehicle have been moving for less than a first threshold amount of time or if one or more of the vehicles in the path of the present vehicle have been stopped for greater than a second threshold amount of time. Method 900 may make the judgements from data provided via other vehicles in a line of vehicles. If method 700 judges that one or more vehicles in the path of the present vehicle have been moving for less than the first threshold amount of time or if one or more of the vehicles in the path of the present vehicle have been stopped for greater than the second threshold amount of time, the answer is yes and method 900 proceeds to 914. Otherwise, method 900 proceeds to exit.

For example, if a vehicle in the path of the first vehicle and in front of the second vehicle moved for less than the first threshold amount of time the most recent time the vehicle moved, then the answer is yes and method 900 proceeds to 914. It should be noted that if the vehicle is presently moving and the amount of time that the vehicle has presently been moving is less than the first threshold, then the amount of time the vehicle spent moving during a previous time the vehicle moved is the basis for judging if the vehicle moved for less than a threshold amount of time.

In another example, if a vehicle in the path of the first vehicle and in front of the second vehicle stopped for greater than the second threshold amount of time the most recent time the vehicle stopped, then the answer is yes and method 900 proceeds to 914. It should be noted that if the vehicle is presently stopped and the amount of time that the vehicle has presently been stopped is less than the second threshold, then the amount of time the vehicle spent stopped during a previous time the vehicle was stopped is the basis for judging if the vehicle was stopped for greater than a threshold amount of time.

The amount of time the vehicle is stopped combined with the amount of time the vehicle was moving may be indicative of the frequency that vehicles are stopping and starting in the line of vehicles. If the amount of time that vehicles are moving is short, it may be desirable to reduce driver demand torque for a given accelerator pedal position so that a vehicle may be activated longer to extend the amount of time between vehicle stops so that shorter more frequent engine stops may be prevented. On the other hand, if the amount of time that vehicles are stopped is short, it may be desirable to reduce driver demand torque for a given accelerator pedal position so that a vehicle may be activated longer to extend the amount of time between vehicle stops so that shorter more frequent engine stops may be prevented.

Method 900 may also determine a distance between the second vehicle and a third vehicle positioned directly in the path of the second vehicle with no intervening vehicles. The distance between the second vehicle and the third vehicle may be provided in data received from the second vehicle to the first vehicle or via data provided by the second vehicle and the third vehicle.

At 914, method 900 further reduces driver demand torque for a given accelerator pedal position. In the above methods for adjusting driver demand torque, driver demand torque is adjusted responsive to a distance between the first and the second vehicle. Method 900 may provide an adjustment to the distance between the first vehicle and the second vehicle to compensate for relative movement of vehicles in a line of vehicles so that one of the same methods described above may determine driver demand torque. Additionally, method 900 may provide further adjustments to the distance between the first vehicle and the second vehicle based on a distance between the second vehicle and the third vehicle. For example, if an amount of time a vehicle is stopped in a line of vehicles ahead of the second vehicle is greater than the first threshold, and if the distance between the first vehicle and the second vehicle is 150 meters, method 900 may modify the distance between the first vehicle and the second vehicle (e.g., a compensated distance between the first vehicle and the second vehicle) to a distance of 130 meters. Then, method 900 recalculates and determines driver demand torque as described in one of the methods at step 906 according to the distance between the first vehicle and the second vehicle being 130 meters. Driveline torque (e.g., torque provided via driveline propulsion sources) is then commanded to the driver demand torque.

Similarly, if the second vehicle is within threshold distance of a third vehicle that is directly in front of the second vehicle and in the path of the second vehicle, and if the distance between the first vehicle and the second vehicle is 150 meters, method 900 may modify the distance between the first vehicle and the second vehicle (e.g., a compensated distance between the first vehicle and the second vehicle) to a distance of 130 meters. Then, method 900 recalculates and determines driver demand torque as described in one of the methods at step 906 according to the distance between the first vehicle and the second vehicle being 130 meters. Driveline torque (e.g., torque provided via driveline propulsion sources) is then commanded to the driver demand torque.

In this way, driver demand torque may be further reduced for a given accelerator pedal position responsive to movement of vehicles in a line of vehicles in front of the second vehicle and in the travel path of the first and second vehicles. This action may further reduce the possibility of short engine stopping intervals than may degrade the present vehicle (e.g., the first vehicle). Method 900 proceeds to exit.

Thus, the method of FIG. 9 provides for a vehicle operating method, comprising: receiving vehicle road position data of a first vehicle and a second vehicle to a controller; adjusting a relationship between accelerator pedal position and driveline torque (e.g., accelerator pedal position is the basis for determining driver demand torque and driveline torque is commanded to the driver demand torque) of the first vehicle in response to a distance between the first vehicle and the second vehicle; and adjusting output of a driveline responsive to the relationship. The method includes where adjusting the relationship includes adjusting a filtering factor of a low pass filter for an accelerator pedal input increasing a driver demand torque and not adjusting filtering for the accelerator pedal input decreasing the driver demand torque. The method includes where adjusting the relationship includes adjusting a transfer function describing driveline torque as a function of accelerator pedal position. The method includes where adjusting the relationship includes reducing the driveline torque, and further comprising: adjusting the relationship in further response to a distance between the second vehicle and a third vehicle. The method includes where the driveline torque is reduced as a distance between the first vehicle and the second vehicle decreases. The method includes where the driveline torque is increased as a distance between the first vehicle and the second vehicle increases. The method includes where adjusting output of the driveline includes adjusting engine torque. The method includes where adjusting output of the driveline includes adjusting electric machine torque.

The method of FIG. 9 also provides for a vehicle operating method, comprising: receiving vehicle road position data of a second vehicle and a third vehicle to a controller of a first vehicle, the third vehicle positioned in front of the second vehicle; adjusting a relationship between accelerator pedal position and driveline torque of the first vehicle in response to a most recent amount of time the third vehicle was stopped and a most recent amount of time the third vehicle is moving without being stopping while the second and third vehicles are traveling in a line of at least two vehicles; and adjusting output of a driveline responsive to the relationship. The method further comprises adjusting the relationship in response to a distance between the first vehicle and the second vehicle.

In some examples, the method includes where adjusting the relationship includes adjusting a filtering factor of a low pass filter for an accelerator pedal input increasing a driver demand torque and not adjusting filtering for the accelerator pedal input decreasing the driver demand torque. The method includes where adjusting the relationship includes adjusting a transfer function describing driveline torque as a function of accelerator pedal position. The method includes where adjusting output of the driveline includes adjusting engine torque. The method includes where adjusting output of the driveline includes adjusting electric machine output. The method includes where the road position data of the second vehicle and the third vehicle is transmitted via the second and third vehicle. The method includes where the road position data of the second vehicle and the third vehicle is received from road sensors.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A vehicle operating method, comprising:
receiving vehicle road position data of a first vehicle and a second vehicle to a controller;
adjusting a relationship between accelerator pedal position and driveline torque of the first vehicle in response to a distance between the first vehicle and the second vehicle, where adjusting the relationship includes reducing the driveline torque;
adjusting the relationship in further response to a distance between the second vehicle and a third vehicle; and
adjusting output of a driveline responsive to the relationship.

2. The method of claim 1, where adjusting the relationship includes adjusting a filtering factor of a low pass filter for an accelerator pedal input increasing a driver demand torque and not adjusting filtering for the accelerator pedal input decreasing the driver demand torque.

3. The method of claim 1, where adjusting the relationship includes adjusting a transfer function describing driveline torque as a function of accelerator pedal position.

4. The method as claimed in claim 1, where the driveline torque is reduced as the distance between the first vehicle and the second vehicle decreases.

5. The method of claim 1, where the driveline torque is increased as the distance between the first vehicle and the second vehicle increases.

6. The method of claim 1, where adjusting output of the driveline includes adjusting engine torque.

7. The method of claim 1, where adjusting output of the driveline includes adjusting electric machine torque.

8. A vehicle operating method, comprising:
receiving vehicle road position data of a second vehicle and a third vehicle to a controller of a first vehicle, the third vehicle positioned in front of the second vehicle;
adjusting a relationship between accelerator pedal position and driveline torque of the first vehicle in response to a most recent amount of time the third vehicle was stopped and a most recent amount of time the third vehicle is moving without being stopped while the second and third vehicles are traveling in a line of at least two vehicles; and
adjusting output of a driveline responsive to the relationship.

9. The method of claim 8, further comprising adjusting the relationship in response to a distance between the first vehicle and the second vehicle.

10. The method of claim 8, where adjusting the relationship includes adjusting a filtering factor of a low pass filter for an accelerator pedal input increasing a driver demand torque and not adjusting filtering for the accelerator pedal input decreasing the driver demand torque.

11. The method of claim 8, where adjusting the relationship includes adjusting a transfer function describing driveline torque as a function of accelerator pedal position.

12. The method of claim 8, where adjusting output of the driveline includes adjusting engine torque.

13. The method of claim 8, where adjusting output of the driveline includes adjusting electric machine output.

14. The method of claim 8, where the road position data of the second vehicle and the third vehicle is transmitted via the second and third vehicles.

15. The method of claim 8, where the road position data of the second vehicle and the third vehicle is received from road sensors.

16. A vehicle system, comprising:
an engine;
vehicle position sensors;
an accelerator pedal; and
a controller including executable instructions stored in non-transitory memory to decrease driveline torque delivered by the engine or a second propulsion source of a first vehicle in response to constant output of the accelerator pedal and a distance between the first vehicle and a second vehicle decreasing as indicated via the vehicle position sensors and to adjust a relationship between a position of the accelerator pedal and driveline torque of the first vehicle in response to a most recent amount of time a second vehicle and a third vehicle are stopped and a most recent amount of time the second and third vehicles are moving without being stopped while the second and third vehicles are traveling in a line of at least two vehicles.

17. The vehicle system of claim 16, where the second propulsion source is an electric machine.

18. The vehicle system of claim 16, further comprising additional instructions to increase driveline torque delivered by the engine or the second propulsion source of the first vehicle in response to constant output of the accelerator pedal and the distance between the first vehicle and the second vehicle increasing as indicated via the vehicle position sensors.

* * * * *